United States Patent [19]

Ohkumo et al.

[11] Patent Number: 4,848,544

[45] Date of Patent: Jul. 18, 1989

[54] CONTROL SYSTEM FOR A CLUTCH FOR A VEHICLE

[75] Inventors: Hiroya Ohkumo; Ryuzo Sakakiyama, both of Tokyo, Japan

[73] Assignee: Fuji Jukogyo Kabushiki Kaisha, Tokyo, Japan

[21] Appl. No.: 40,395

[22] Filed: Apr. 20, 1987

[30] Foreign Application Priority Data

Apr. 24, 1986 [JP] Japan ................................ 61-096467

[51] Int. Cl.$^4$ .............................................. B60K 41/02
[52] U.S. Cl. ............................ 192/0.076; 192/0.032; 192/21.5; 192/103 R
[58] Field of Search ................. 192/0.032, 0.034, 0.07, 192/0.075, 0.076, 0.096, 21.5, 103 R, 0.033

[56] References Cited

U.S. PATENT DOCUMENTS

| | | | |
|---|---|---|---|
| 2,788,872 | 4/1957 | Winther | 192/0.075 |
| 4,675,817 | 6/1987 | Sakakiyama et al. | 192/0.076 |
| 4,708,227 | 11/1987 | Kitade | 192/0.032 |

FOREIGN PATENT DOCUMENTS

143140  7/1985  Japan ................................ 192/0.076

*Primary Examiner*—Rodney H. Bonck
*Assistant Examiner*—David A. Testardi
*Attorney, Agent, or Firm*—Martin A. Farber

[57] ABSTRACT

A system for controlling a drag torque of an electromagnetic clutch at releasing of an accelerator pedal of a motor vehicle with a continuously variable belt drive transmission. A detector is provided for detecting whether vehicle speed is lower than a predetermined low speed. At the low vehicle speed, the drag current is gradually reduced as the vehicle speed increases.

6 Claims, 6 Drawing Sheets

CONTROL SYSTEM FOR A CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A No. 151038. The electromagnetic clutch of the transmission is controlled by a control system to provide various operational modes such as a starting mode of a vehicle, reverse excitation mode, drag mode, and mode of lock-up engagement. One of the modes is selected in accordance with a position of a selector lever and driving conditions to control the electromagnetic clutch.

In the drag mode, a small clutch current flows in a coil of the electromagnetic clutch when an accelerator pedal is released in a low vehicle speed range thereby applying a small drag torque to a driven member of the clutch to reduce clearances formed in the transmission. Accordingly, at a start of the vehicle or reacceleration of the vehicle at low vehicle speed, the starting torque necessary for driving the driven member is reduced, and hence, the power of an engine is properly transmitted to driving wheels through the transmission, so that the vehicle can be smoothly started or reaccelerated.

However, in the continuously variable belt-drive transmission, the starting torque needed for the reacceleration increases as the vehicle speed decreases. In the system of the afore-mentioned prior art, the drag torque is constant regardless of the vehicle speed. Accordingly, the drag torque is not effectively exerted on the transmission at the reacceleration.

SUMMARY OF THE INVENTION

The object of the present invention is to provide a system for controlling a clutch where a drag torque is controlled in consideration of the starting torque in the transmission system during coasting at a low vehicle speed.

According to the present invention, there is provided a system for controlling a drag torque of a clutch of a motor vehicle, the system comprising first detecting means for detecting releasing of an accelerator pedal of the vehicle and for producing a release signal, second detecting means for producing a vehicle speed signal dependent on vehicle speed, third detecting means for detecting whether the vehicle speed is lower than a predetermined low speed and for producing a low speed signal, first means responsive to the release signal and low speed signal for providing a drag torque in the clutch, and responsive to the vehicle speed signal for gradually reducing the drag torque as the vehicle speed increases.

In an aspect of the invention, the system further comprises third means for decreasing the drag torque when the vehicle speed is zero.

The other objects and features of this invention will be apparently understood from the following description with reference to the accompanying drawings.

DETAILED DESCRIPTION OF THE PREFERRED EMBODIMENT

Figure 1:
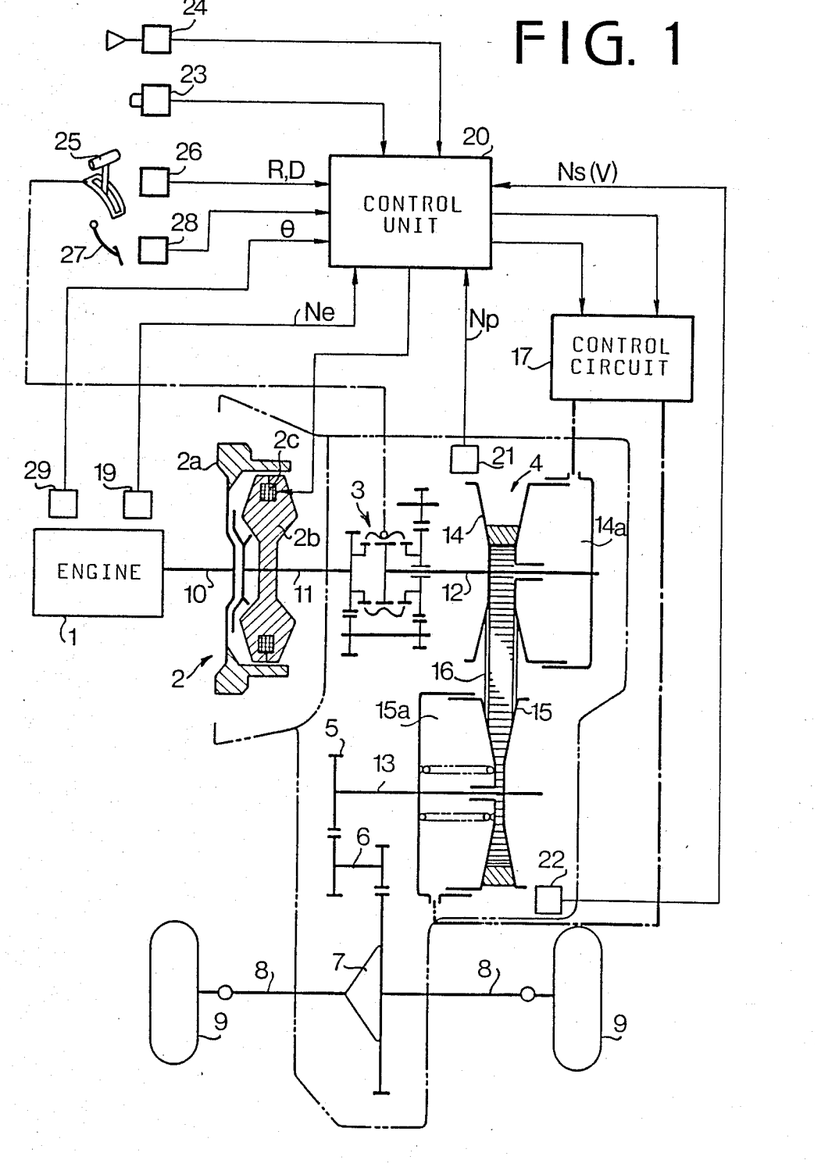
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to the crankshaft 10 of the engine 1, a driven member 2b secured to an input shaft 11 of the transmission 4, and a magnetizing coil 2c provided in the driven member 2b. Magnetic powder of material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal during the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) of the transmission and a line pressure control singal to the control circuit 17.

Figure 2A:
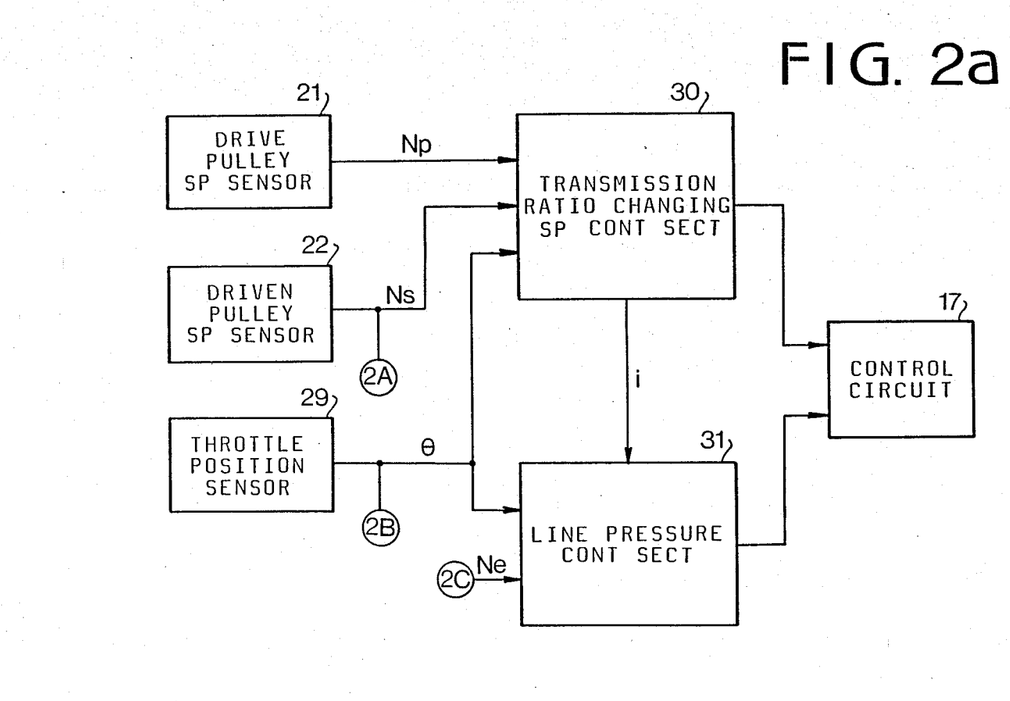
FIGS. 2a and 2b show a block diagram of a control unit according to the present invention.
Figure 2B:
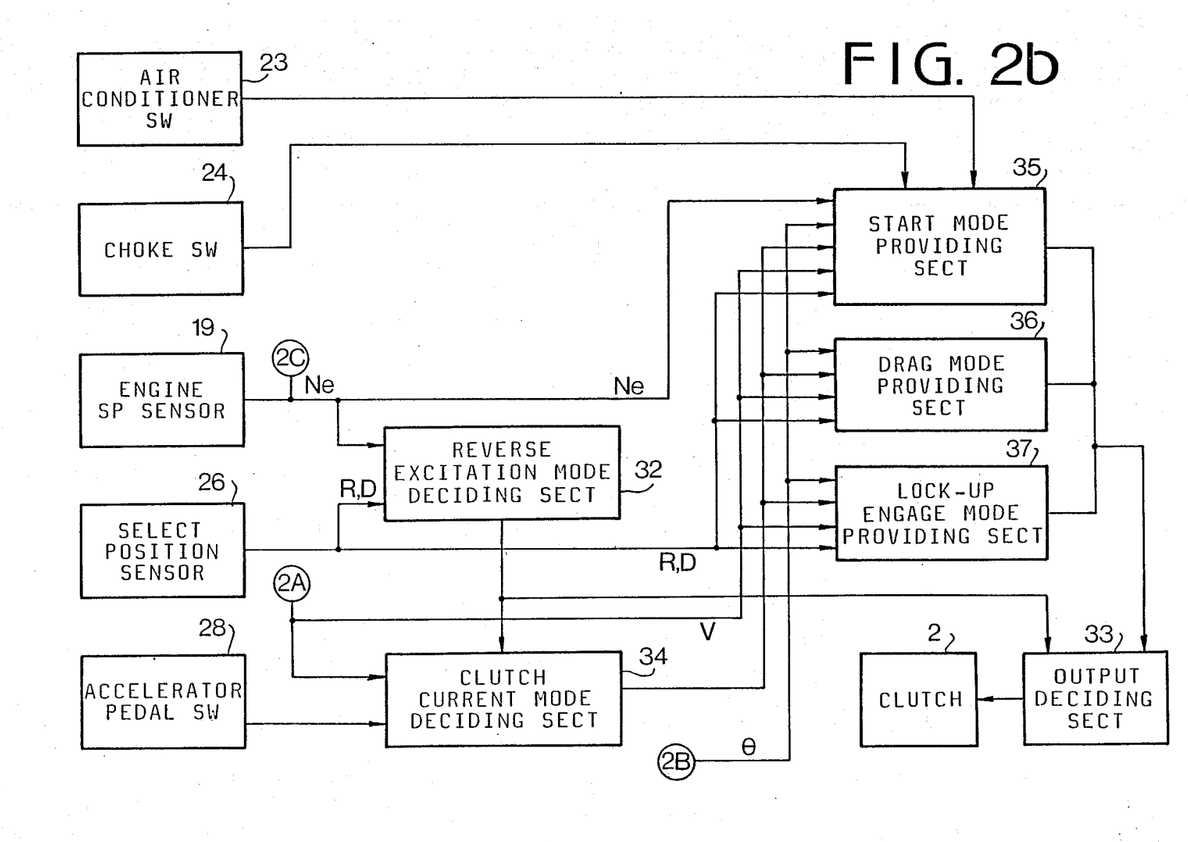

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) di/dt. A line pressure control section 31 is applied with an engine speed signal Ne of the sensor 19, throttle position signal $\theta$ of the sensor 29, and an actual transmission ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by signals from the throttle valve opening degree $\theta$, vehicle speed V, and driving positions of the D-range and R-range.

The drag mode providing section 36 decides a small drag current when the accelerator pedal 27 is released at a low speed in each drive position for providing a drag torque to the clutch 2 for the reduction of clearances formed in the transmission and for the smooth start of the vehicle.

Figure 3:
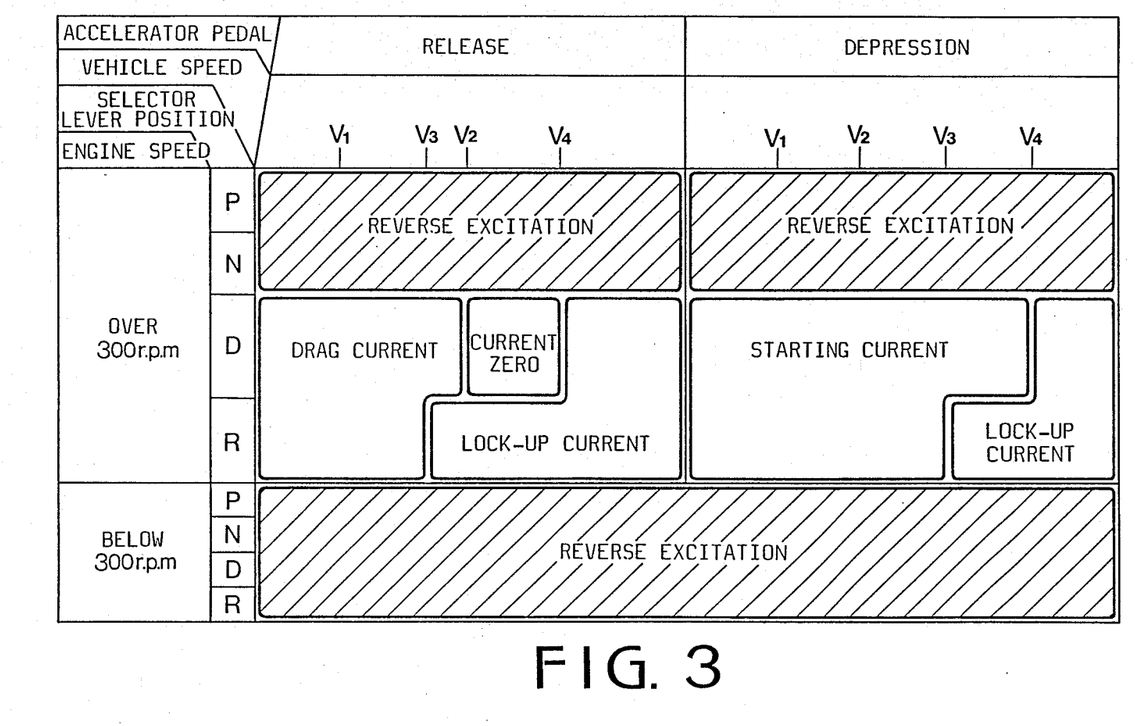
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Figure 4A:
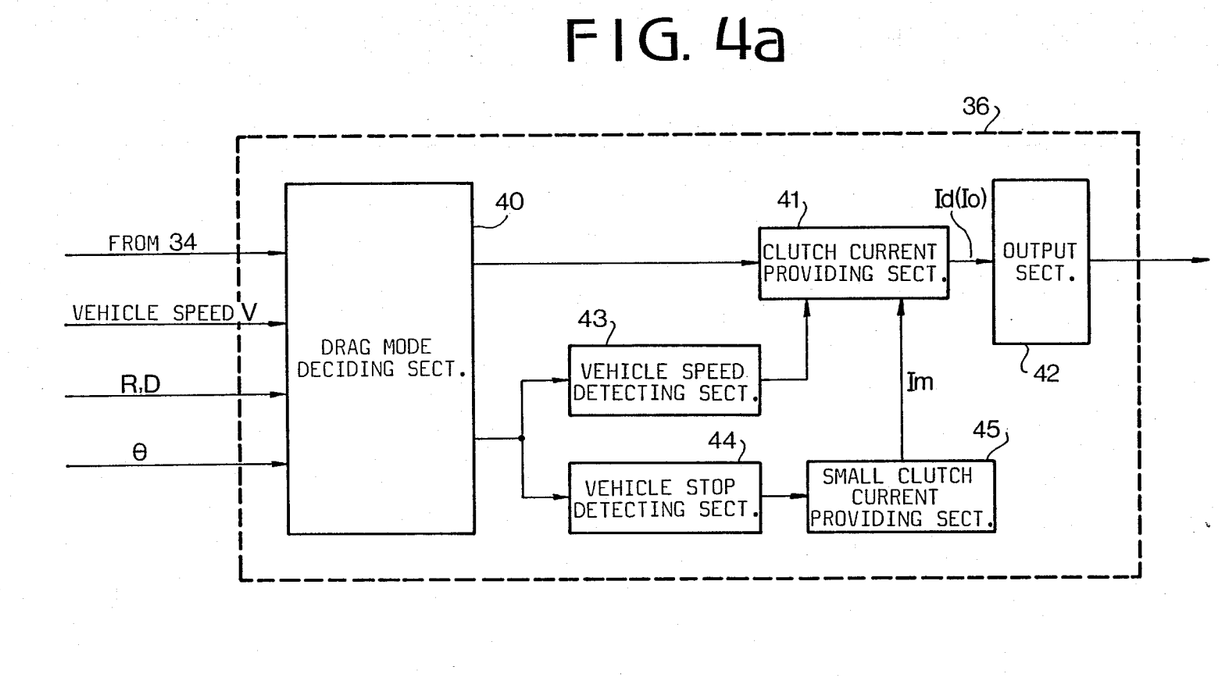
FIG. 4a is a block diagram of a main part of the system according to the present invention.

Referring to FIG. 4a, the drag mode providing section 36 is provided with a drag mode deciding section 40 applied with output signals of throttle valve opening degree $\theta$, vehicle speed V, drive position R-range and D-range, and clutch current mode deciding section 34. The drag mode deciding section 40 decides that the vehicle is in a drag mode when the vehicle speed is lower than a predetermined vehicle speed $V_3$ or $V_4$, as shown in FIG. 3, and applies a drag mode deciding signal to a clutch current providing section 41.

Figure 4B:
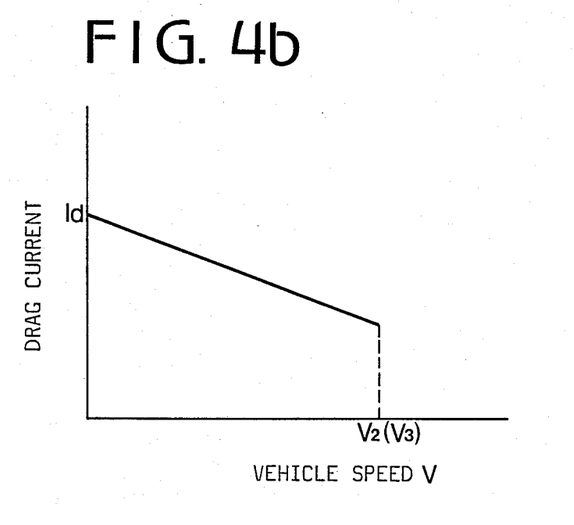
FIG. 4b is a graph showing a variation of drag current.

The drag mode providing section 36 is further provided with a vehicle speed detecting section 43 to which the vehicle speed V is supplied. At the D-range, the vehicle speed detecting section 43 detects a vehicle speed lower than a predetermined speed $V_2$ so as to apply a drag current signal to the clutch current providing section 41. The clutch current providing section 41 selectively produces a signal for a zero current $I_O$ depending on the drag mode deciding signal from the section 40 and a signal for a drag current $I_d$ in accordance with the drag current signal. Either signal is applied to the output deciding section 33 through an output section 42. As shown in FIG. 4b, the drag current $I_d$ is predetermined as a function of the vehicle speed V in dependency on the starting torque of the transmission. Namely, the drag current increases with decrease of the vehicle speed. The clutch current providing section 41 has a map corresponding to FIG. 4b, and provides the drag current $I_d$ in accordance with the vehicle speed.

Figure 5:
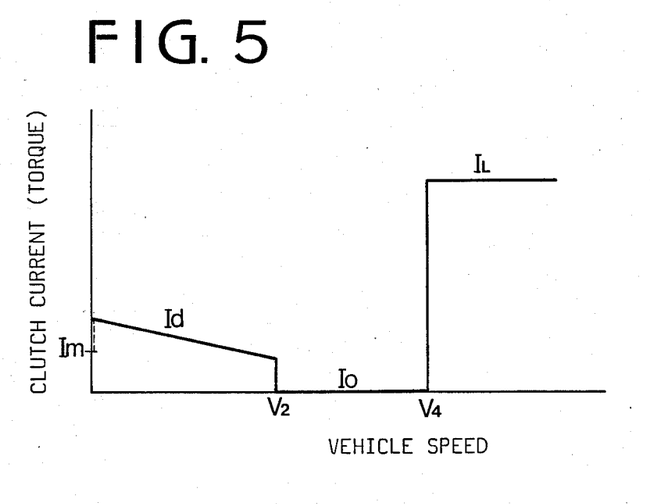
FIG. 5 is a graph showing clutch current characteristics.

The operation of the system will be described hereinafter with reference to FIG. 5 showing a characteristic of the clutch current.

When the vehicle speed becomes lower than the speed $V_4$ at the release of the accelerator pedal at D-range, the drag mode deciding section 40 decides that the vehicle is in the drag mode. Accordingly, the lock-up current Ihd L becomes a zero current $I_O$ to disengage the clutch 2. When the vehicle is further decelerated to a speed lower than $V_2$, the drag current $I_d$ which is decided at the current deciding section 41 in response to the output of the vehicle speed detecting section 43 flows in the coil 2c. The drag current $I_d$ increases as the vehicle speed decreases so as to provide drag torque corresponding to the starting torque. Thus, when the vehicle speed is lower than the speed $V_2$, the starting torque at the reacceleration is compensated by the drag torque at any vehicle speed including zero. Thus, when the accelerator pedal is depressed again, the vehicle can be smoothly reaccelerated.

In the above-described embodiment, the drag torque is at maximum when the vehicle speed is zero. If the drag torque exceeds the total of internal loss of the transmission system, such as friction, and running resistance of the vehicle, the vehicle starts to creep. Accordingly, the vehicle must be braked by depressing a brake pedal, so as to keep the vehicle in the stopped state.

In order to prevent such an inconvenience, vehicle stop detecting section 44 and a small clutch current providing section 45 are provided. If the vehicle stop detecting section 44 detects that the vehicle is at a stop, the small clutch current providing section 45 reduces the drag current to a predetermined value (Im) as shown in FIG. 5. Thus, the creeping of the vehicle can be prevented.

It will be understood that the present invention may be applied to other automatic clutches besides electromagnetic clutches.

From the foregoing, it will be understood that the present invention provides a control system for a clutch wherein clutch torque in the drag mode is properly controlled in accordance with the starting torque dependent on vehicle speed. Thus, the vehicle can be smoothly reaccelerated while retaining characteristic of the drag torque.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a drag torque of a clutch of a motor vehicle, the system comprising:
    first detecting means for detecting releasing of an accelerator pedal of the vehicle for producing a release signal;
    second detecting means for producing a vehicle speed signal dependent on vehicle speed;
    third detecting means for detecting vehicle speed lower than a predetermined low speed for producing a low speed signal;
    first means responsive to the release signal and low speed signal for providing a drag torque in the clutch, and responsive to the vehicle speed signal for gradually continuously increasing the drag torque as the vehicle speed decreases to zero in dependency on starting torque of the transmission required for smooth reacceleration, which starting torque continuously increases as vehicle speed decreases, for compensating the starting torque at reacceleration enabling smooth reacceleration of the vehicle.

2. The system according to claim 1 wherein the clutch is an electromagnetic clutch.

3. The system according to claim 1 further comprising second means for decreasing the drag torque when the vehicle speed is zero.

4. A system for controlling a drag torque of an electromagnetic clutch selectively transmitting power of an engine to a transmission for a motor vehicle having an accelerator pedal operatively connected to the engine, a vehicle speed sensor responsive to an output of the transmission for producing a vehicle speed signal, an engine speed sensor for producing an engine speed signal, an accelerator pedal switch for sensing depression of the accelerator pedal for producing an accelerator signal, mode deciding means responsive to the vehicle speed signal, engine speed signal and accelerator signal producing output signals for deciding a start mode, drag mode and lock-up mode, respectively, start mode providing means for providing the start mode at depression of the accelerator pedal to produce a starting torque at the electromagnetic clutch responsive to the output signal for the start mode decided by the mode deciding means, drag mode providing means for providing the drag mode at release of the accelerator pedal for producing a drag current to produce drag torque at the electromagnetic clutch responsive to the output signal for the drag mode decided by the mode deciding means, and lock-up mode providing means for providing the lock-up mode for producing a lock-up current to lock-up the electromagnetic clutch responsive to the output signal for the lock-up mode decided by the mode deciding means, wherein the drag mode providing means comprises:
    drag mode deciding means for producing a drag mode deciding signal when the vehicle speed is lower than a first predetermined value,
    vehicle speed detecting means for producing a reduced signal and a drag current signal when the vehicle speed is higher and lower, respectively, than a second predetermined value which is lower than the first predetermined value,
    clutch current providing means responsive to the drag mode deciding signal, the reduced signal, and the drag current signal for selectively producing a zero current or a drag current in accordance with the respective reduced signal and drag current signal, and
    said clutch current providing means for deciding the drag current in accordance with a characteristic representing a continual increase of the drag current with decreasing of the vehicle speed to a stop condition and for supplying the drag current to the electromagnetic clutch to provide the drag torque corresponding to starting torque so as to achieve smooth reacceleration of the vehicle.

5. The system according to claim 4, wherein said clutch current providing means has a map of the increase of the drag current with decreasing vehicle speed.

6. A system for controlling a drag torque of an electromagnetic clutch selectively transmitting power of an engine to a transmission for a motor vehicle having an accelerator pedal operatively connected to the engine, a vehicle speed sensor responsive to an output of the transmission for producing a vehicle speed signal, an engine speed sensor for producing an engine speed signal, an accelerator pedal switch for sensing depression of the accelerator pedal for producing an accelerator signal, mode deciding means responsive to the vehicle speed signal, engine speed signal and accelerator signal producing output signals for deciding a start mode, drag mode and lock-up mode, respectively, start mode providing means for providing the start mode at depression of the accelerator pedal to produce a starting torque at the electromagnetic clutch responsive to the output signal for the start mode decided by the mode deciding means, drag mode providing means for providing the drag mode at release of the accelerator pedal for producing a drag current to produce drag torque at the electromagnetic clutch responsive to the output signal for the drag mode decided by the mode deciding means, and lock-up mode providing means for providing the lock-up mode for producing a lock-up current to lock-up the electromagnetic clutch responsive to the output signal for the lock-up mode decided by the mode deciding means, wherein the drag mode providing means comprises:
    drag mode deciding means for producing a drag mode deciding signal when the vehicle speed is lower than a first predetermined value,
    vehicle speed detecting means for producing a reduced signal and a drag current signal when the vehicle speed is higher and lower, respectively, than a second predetermined value which is lower than the first predetermined value,
    clutch current providing means responsive to the drag mode deciding signal, the reduced signal, and the drag current signal for selectively producing a zero current or a drag current in accordance with the respective reduced signal and drag current signal, and said clutch current providing means for deciding the drag current in accordance with a characteristic representing an increase of the drag current with decreasing of the vehicle speed and for supplying the drag current to the electromagnetic clutch to provide the drag torque corresponding to starting torque so as to achieve smooth reacceleration of the vehicle, and wherein the drag mode providing means further comprises vehicle stop detecting means responsive to the vehicle speed signal for detecting a stop of the vehicle and for producing a stop signal, and small clutch current providing means responsive to the stop signal for supplying a signal to the clutch current providing means to reduce the drag current to a predetermined value to control the electromagnetic clutch so as to prevent creeping of the vehicle.

* * * * *